United States Patent [19]

Turney

[11] 3,917,822
[45] Nov. 4, 1975

[54] IODINE-CONTAINING ANIONIC SANITIZERS

[75] Inventor: George Holbrook Turney, King of Prussia, Pa.

[73] Assignee: Pennwalt Corporation, Philadelphia, Pa.

[22] Filed: July 29, 1974

[21] Appl. No.: 492,668

[52] U.S. Cl. .............................................. 424/150
[51] Int. Cl.² ........................................ A01N 11/00
[58] Field of Search ........................... 424/150, 80

[56] References Cited
UNITED STATES PATENTS

| | | | |
|---|---|---|---|
| 3,081,232 | 3/1963 | Powers et al. | 424/150 |
| 3,355,386 | 11/1967 | Cantor et al. | 424/150 |
| 3,513,098 | 5/1970 | Cantor et al. | 424/150 |
| 3,728,449 | 4/1973 | Cantor et al. | 424/150 |
| 3,751,562 | 8/1973 | Nichols | 424/150 |
| 3,753,968 | 8/1973 | Ward | 260/514 K |

*Primary Examiner*—Albert T. Meyers
*Assistant Examiner*—D. W. Robinson
*Attorney, Agent, or Firm*—Robert G. Danehower

[57] ABSTRACT

This invention is directed to iodine-containing compositions and their use as sanitizing compositions in dilute aqueous solution. The new compositions are iodinated polyalkylene oxide glycol monoesters of 5 or 6-carboxy-4-hexyl-2-cyclohexene-1-octanoic acid.

11 Claims, No Drawings

IODINE-CONTAINING ANIONIC SANITIZERS

BRIEF DESCRIPTION OF INVENTION

Iodophors are well known to require acidic aqueous solutions to maintain the stability of the iodine complex. An iodophor is defined as a mixture of iodine and an iodine carrier which forms an iodine complex having the ability to increase the iodine solubility and stability in aqueous solution, the aqueous solution of complexed iodine having germicidal properties. Phosphoric acid and hydroxy acetic acids have been widely used for this purpose in preference to mineral acids in order to provide iodophor stability and have a composition which is not corrosive and which is not irritating to the hands or to a cow's udder.

I have now discovered a new iodophor composition which is effective in maintaining iodine stability in aqueous solution without the necessity of adding acid to the solution. The new compositions are iodinated polyalkylene oxide glycol monoesters of C-21 dicarboxylic acid having the formula 5 or 6-carboxy-4-hexyl-2-cyclohexene-1-octanoic acid. These esters will be referred to in this application for convenience as monoesters of C-21 dicarboxylic acid. These new iodine complexes are effective iodine sanitizers. The new iodophors may be used in the food industry for sterilizing milk and food processing equipment. They may also be used with the addition of compatible detergents and surfactants for cleaning and sterilizing food tanks and food processing equipment. In dilute aqueous solution my new iodophors are used to sterilize the hands of food processors or food servers and for sterilizing cow's udders after milking to control mastitis.

The basis of my new sanitizer is the C-21 dicarboxylic compound derived from fatty acids which can be obtained by a process described in U.S. Pat. No. 3,753,968 which is incorporated by reference. This dicarboxylic acid forms the hydrophobic portion of the detergent while the hydrophyllic portion is derived from polyalkylene oxides at one of the carboxylic groups.

These polyalkylene oxides are either ethylene oxide, propylene oxide or mixed ethylene-propylene oxide condensates. The chain length will range from about 3 moles to about 34 moles of polyalkylene oxide.

The iodinated complex is prepared by adding iodine crystals to the monoesters of the C-21 dicarboxylic acid with mild agitation. The mixing is continued until all of the iodine crystals have reacted.

The iodophor sanitizing compositions may then be prepared by adding water, sufficient solubilizer to put the iodine complex into solution and finally adjusting the pH for the desired end use by adding alkaline mate-

DETAILED DESCRIPTION OF INVENTION

The C-21 dicarboxylic acid is obtained by reacting linoleic acid with acrylic acid in the presence of iodine catalyst as disclosed in U.S. Pat. No. 3,753,968. The C-21 dicarboxylic acid is marketed under the trademark DIACID.

The C-21 dicarboxylic acid is then esterified with polyalkylene oxide glycol by methods well known in the chemical arts. Typically, the C-21 dicarboxylic acid and the polyalkylene oxide glycols are mixed together under an inert atmosphere such as nitrogen with agitation while heating to about 210°C. Catalyst such as dibutyl tin oxide and triphenyl phosphate may be used. The reaction is terminated by cooling the reaction mass when the acid number falls to the theoretical number desired. The liquid reaction mass is then usually filtered.

The most reactive carboxylic acid is at the end of the $C_7$ alkyl chain and the monoester of the acid is formed at this point. Temperatures considerably higher than about 200°C must be employed before esterification takes place with the carboxlyic group attached to the cyclohexene portion of the molecule.

The addition of the polyalkylene oxide chain to the C-21 dicarboxylic acid by esterification forms the esters which are the basis for preparing the iodophors of this invention.

The length of the polyalkylene oxide chain is not critical but it is important in determining the amount of iodine which can be complexed, the greater the chain length, the more iodine can be held in the complex. The length of the polyalkylene oxide chain will range between about 3 moles to about 34 moles. Preferably, the range will be about 6 to about 16 moles. The polyalkylene oxide chain can be added either as a polyethylene oxide glycol or as a polypropylene oxide glycol. Mixed chains of polyethylene and polypropylene oxide glycols are also suitable and the mixtures can either be hetero mixtures or block mixtures as described in U.S. Pat. No. 3,355,386. These esters are designated as the polyalkylene oxide glycol monoesters of C-21 dicarboxylic acid having a mole ratio of polyalkylene oxide glycol to C-21 dicarboxylic acid within the range of about 1 to 1 to about 1 to 2 and in which ester the polyalkylene oxide glycol contains from about 3 to about 34 moles of polyalkylene oxide as described above.

The monoesters of the C-21 dicarboxylic acid may be represented by the following formulae depending on the mole ratio of polyalkylene glycol to C-21 dicarboxylic acid employed in the reaction:

1. Monoester of C-21 Dicarboxylic Acid — 2 moles of C-21 Dicarboxylic Acid to 1 mole of Polyalkylene Glycol

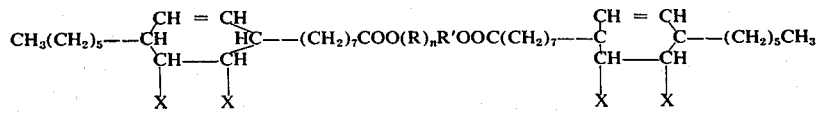

rials. The iodinated C-21 monoesters may be formulated as concentrates providing about 1% to about 20% available iodine or higher.

The diluted iodophor solutions are effective germicidal agents for such bacteria as salmanela typhosa and staphylococcus aureus when tested by the AOAC method.

where R is ethylene oxide, propylene oxide or mixed ethylene-propylene oxides in random distribution or block groups, one X is hydrogen and the other X is carboxylic, $n$ is about 3 to about 34 and where R' is ethylene or propylene.

2. Monoester of C-21 Dicarboxylic Acid — 1 to 1 mole ratio of Polyalkylene glycol to C-21 Dicarboxylic Acid

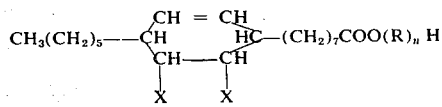

where R is ethylene oxide, propylene oxide or mixed ethylene-propylene oxides in random distribution or block groups where one X is hydrogen and the other X is carboxylic and $n$ is about 3 to about 34.

The type of ester represented by the above formulae is determined by the mole ratio used in the esterification reaction. If two moles of C-21 dicarboxylic acid per mole of polyalkylene oxide glycol then a reaction product is obtained having a major amount of the C-21 Dicarboxylic acid ester having the structure represented by formula 1. If a one to one mole ratio is used the reaction product is primarily the monoester of C-21 dicarboxylic acid represented by formula 2. Intermediate mixtures are obtained by adjusting the mole ratio between one and two.

The polyalkylene oxide glycol monoesters of the C-21 dicarboxylic acid represented in the above formulae are iodinated by adding iodine crystals to the monoester and then agitating the mixture until all of the iodine crystals have reacted. Gently warming the mixture will speed up the reaction. Since the C-21 dicarboxylic acid has an iodine number of 58, a portion of the iodine will react with the hydrophobic portion of the anionic surfactant. This iodine is not available iodine as that term is used in the industry to designate the iodine that is present as a complex with the alkylene oxide portion of the monoester. It is available iodine which provides the germicidal effect. The available iodine is determined by titration with sodium thiosulphate. The total iodine may be determined by combustion methods.

The amount of iodine added to the C-21 dicarboxylic monoester will depend on its end use. I have prepared concentrates containing from about 1 to about 47% by weight available iodine. The sanitizers for contact with the skin are usually at about 1% available iodine. Using the monoester of the C-21 acid which is the subject of this invention, I have been able to prepare concentrates containing as high as 47% by weight available iodine but they are not generally used or sold in such a high concentration.

The iodine added to the monoester of the C-21 dicarboxylic acid to prepare concentrates will generally be at a weight ratio of about 0.05 to 1 to about 2 to 1, preferably from about 0.1 to about 1.65 to 1 weight ratio of iodine to monoester.

The iodinated monoesters of the C-21 acid are only slightly soluble in water and a solubilizer is required to place them in solution and to maintain solubility while subject to the normal storage temperature variations. The solubilizers for iodophors are commonly called iodine solubilizers. The normal storage temperatures range from about 30°F to about 100°F. The amount of solubilizer required to place the iodinated monoesters of C-21 dicarboxylic acid in solution and to insure their solubility within the temperature range of about 30°F to about 100°F is designated as an effective amount of solubilizer. The ratio of solubilizer to iodinated monoester of C-21 dicarboxylic acid will generally be within the range of about 0.3 to 1 to about 7.5 to 1.

The preferred solubilizers for placing the anionic iodinated monoesters of the C-21 dicarboxylic acid in aqueous solution in order to maintain the anionic character of this iodophor system are the anionic alkoxylated phosphate esters, the anionic alkoxylated sulfate esters and the anionic polyalkylene oxide glycol monoesters of C-21 dicarboxylic acid having a mole ratio of polyalkylene oxide glycol to C-21 dicarboxylic acid within the range of about 1 to 1 to about 1 to 2. The polyalkylene oxide glycol chains will generally contain from about 3 to about 34 moles of polyalkylene oxide. The alkoxylated phosphate esters and sulfate esters will generally have a polyalkylene oxide chain of from about 3 to about 34 moles of polyalkylene oxide.

The anionic phosphate esters suitable as solubilizers are the acid phosphate mono and diesters of hydroxyl-terminated polyalkoxide condensates and the complex phosphate ester-salts resulting from neutralization of these acid phosphate esters by a base. The hydrophobic portion of the phosphate ester may be alkanol group of about $C_6$ to about $C_{18}$, phenol or $C_1$ to $C_{16}$ alkyl substituted phenol. Sodium lithium and potassium hydroxides are the commonly used bases in preparing salts. The polyalkylene oxide chains will range from about 3 to about 34 moles of polyalkylene oxide and may be EO, PO or mixed EO-PO polymers.

Examples of alkoxylated phosphate esters are the mono and diphosphate esters of alkoxylated phenol and alkylsubstituted phenol. The mono phosphate esters may be represented by the formula

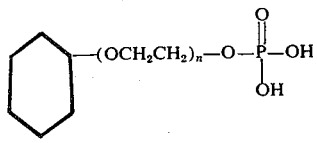

where $n$ is about 3 to about 34. The diphosphate esters may be represented by the formula

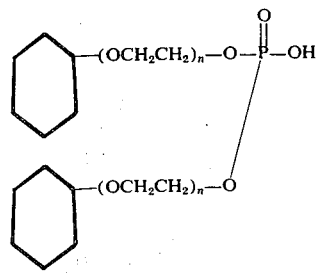

where $n$ is about 3 to about 34. Alkyl substituents on the phenol molecule will range from $C_1$ to $C_{16}$. Phosphate esters of alkoxylated alcohols are also suitable such as the monophosphate ester of hetero EO-PO (4 to 6.8/1) on the mixture of normal decyl and dodecyl alcohols and the monophosphate ester of butyl alcohol containing 6 moles of ethylene oxide.

The second class of anionic solubilizers are the alkoxylated sulfate esters containing about 3 moles to about 16 moles of polyalkylene oxide. The hydrophobic portion of the sulflate esters may be an alkanol group of about $C_6$ to about $C_{18}$ carbons or an aromatic group, preferably phenol or $C_1$ to $C_{16}$ alkyl substituted phenol.

Examples of suitable alkyoxylated sulfate esters are the alkoxylated sulfate esters of phenol and alkylsubstituted phenol. These esters may be represented by the formula

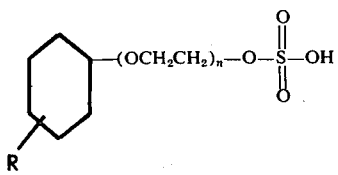

where $n$ is about 3 to about 34 and R is alkyl of 0 to about 16 carbons.

The third class of anionic alkoxylated surfactants useful as iodine solubilizers in my invention are the polyalkylene oxide glycol monoesters of C-21 dicarboxylic acid having a mole ratio of polyalkylene oxide glycol to C-21 dicarboxylic acid within the range of about 1 to 1 to about 1 to 2. The polyalkylene oxide chain will generally contain from about 3 to about 34 moles of polyalkylene oxide of the EO, PO and hetero EO-PO and block mixtures. Examples of these monoesters appear in Table 1.

Where it is not important to maintain the anionic character of the iodophor the iodinated monoesters of the C-21 dicarboxylic acid may be solubilized with the nonionic polyalkylene oxide surfactants. These nonionics will contain polyalkylene oxide polymer chains of about 3 moles to about 16 moles of polyalkylene oxide. Suitable nonionics are the ethoxylated, propoxylated or mixed EO-PO phenols, alkyl phenols, aliphatic alcohols, carboxylic esters and the block and hetero polyoxypropylene-polyoxyethylene copolymers. The alkyl substituent of the alkyl phenols and aliphatic alcohols will range from about $C_6$ to $C_{18}$ carbons. Octyl and nonyl phenol are typical alkyl phenols. Typical alcohols are octyl, decyl, dodecyl, cetyl, lauryl, oleyl, tridecyl and stearyl alcohol. Suitable carboxylic esters are the polyethylene glycol mono or diesters of lauric, oleic, stearic, tall oil and ricinoleic acids. Polyoxyethylene fatty acid amides are also suitable nonionic solubilizers. The polyoxypropylene-polyoxyethylene block polymers sold under the Pluronic trademark by Wyandotte Chemicals are useful nonionic solubilizers for my iodophors.

It will be appreciated that more than one solubilizer can be used of a single class as well as a mixture of solubilizers from different classes. I have found that the ratio of solubilizer to iodinated monoester of C-21 dicarboxylic acid in my compositions will range from about 0.2 to about 20 on a weight basis.

Alcohols such as ethyl alcohol and glycols such as ethylene glycol or propylene glycol are known solubilizers for iodine complexes and may be used in conjunction with the polyalkylene oxide containing surfactants.

Concentrates containing from about 1 to about 47% available iodine are readily prepared by iodinating the polyalkylene oxide of the C-21 monoester, adding a solubilizer and if desired, water and an alkaline material to adjust the pH. Agitation of the materials will assist in solubilizing the iodinated monoester. Suitable alkaline materials are trisodium phosphate, disodium phosphate, sodium hydroxide, potassium hydroxide, sodium carbonate, sodium bicarbonate, etc.

The pH of the concentrates and use solutions are always maintained on the acid side, generally within the range of about 4 to about 6.5 since the iodine complexes are only stable in acid. This assures a longer shelf life for the iodine formulations. The pH determinations are made with a pH meter.

The amount of water added to any particular solution or concentrate is not critical. I have found that the ratio of water to the iodinated monoesters of C-21 dicarboxylic acid in my concentrates may range from 0 to about 25 on a weight basis.

The iodinated compositions of this invention can be used as iodine sanitizers in food plants and dairies. The sanitizers derived from the iodinated monoester of the C-21 dicarboxylic acid are generally supplied as iodine solutions containing from about 1 about 1.75% available iodine in a water carrier. The food processor will then dilute it further with water at a concentration of from 12.5 to 500 ppm of available iodine to form the sanitizing solution. The sanitizers are always used as acidic solutions, generally at a pH of about 4 to about 6.5.

The sanitizing solution is applied to food processing tables, floors, walls and utensils. It can be applied by a spray, by fogging, by immersion of the article in the liquid sanitizing solution and it can be applied as a circulating-in-line sanitizer. Generally, the iodine sanitizer is applied after a cleaning operation using a detergent or a soap. The iodine sanitizing solution should be in contact with the metal that is being sanitized for at least 2 minutes. The iodine sanitizers are used to ambient temperatures and should not be heated. Following the sanitizing treatment, the surfaces are generally rinsed with potable water.

The iodophor compositions are also used as a test dip after milking for mastitis control. For this use the sanitizer is diluted with water or it can be supplied as a prediluted solution of from about 5,000 to about 10,000 ppm of available iodine. At this concentration the iodine solution acts as a disinfectant. The solution is applied to the teat in a cup and the iodine solution is allowed to remain on the teat.

The iodophors of this invention can also be diluted with water to a concentration of from about 12.5 to about 500 ppm of available iodine for sanitizing the skin of humans and for sanitizing articles of clothing such as rubbers, boots and gloves.

The best mode of practicing my invention will be apparent from a consideration of the following examples.

EXAMPLE 1

Preparation of Monoesters

The polypropylene oxide glycol monoester of the C-21 dicarboxylic acid was prepared by esterifying 1 mole of a polypropylene oxide glycol with 2 moles of C-21 dicarboxylic acid for 3 hours at 210°C. in a nitrogen atmosphere. The reaction was monitored by periodic determination of the acid number. Dibutyl tin oxide and triphenyl phosphate at 0.5% concentration was used to catalyze the reaction. Following completion of the reaction, the liquid product was filtered to remove all solids.

Using the procedure outlined above, the following liquid polyalkylene oxide monoesters of the C-21 dicarboxylic acid were prepared: polyethylene glycol — 4.5 moles, polyethylene glycol — 9 moles, polypropylene glycol — 8 moles, polyethylene glycol — 13.5 moles and polypropylene glycol — 10 to 13 moles. These monoesters have the formula represented by 1 on page 4. In the same manner, monoesters were prepared using 1 to 1 mole ratios of C-21 dicarboxylic acid and polyalkylene oxide glycol having the formula represented by 2 on page 6.

EXAMPLE 2

Iodination of Monoesters

One hundred thirty five grams of the liquid polyethylene glycol (13.5 moles of peg.) monoester of the C-21 dicarboxylic acid was weighed into a glass reactor. Fourteen grams of crystalline iodine was added with mild stirring. In 30 to 60 minutes the reaction product had a black tarry appearance. No iodine crystals were visible. No external heat or cooling was necessary to control the reaction, neither was any catalyst used.

Following the procedure of Example 2, iodinated products were obtained as shown in Table 1.

EXAMPLE 3

Concentrates of Iodinated Monoester of C-21 Carboxylic Acid

Concentrates of the iodinated monoesters of the C-21 dicarboxylic acid prepared as described in Example 2 are formulated by adding one or more of the solubilizing agents described above. The concentration of the iodine is regulated in a number of ways, for example, by the amount of iodine added to the monoester or by the amount of solubilizer, water and additive to control the pH. In general, an effective amount of the solubilizer used will be that amount required to put the monoester of the C-21 dicarboxylic acid in solution plus an additional amount to prevent phase separation if the temperature was to drop to about 30°F. The pH additive, if needed, would be the alkaline materials previously described to bring the pH within the range of about 4.5 to about 6.5. Typical concentrates are shown in Table 2.

Table 1

| Iodinated Monoesters | |
|---|---|
| Polypropylene glycol (8 moles ppo.*) monoester of C-21 dicarboxylic acid (1 mole ppg*. to 2 moles Diacid) | 135 grams |
| Iodine | 69 grams |
| Polyethylene glycol (4.5 moles peo.*) monoester of C-21 dicarboxylic acid (1 mole ppg. to 2 moles Diacid) | 135 grams |
| Iodine | 32 grams |
| Polyethylene glycol (9 moles peo.) monoester of C-21 dicarboxylic acid (1 mole peg.* to 2 moles Diacid) | 135 grams |
| Iodine | 63 grams |
| Polyethylene glycol (13.5 moles peo.) monoester of C-21 dicarboxylic acid (1 mole peg. to 2 moles Diacid) | 135 grams |
| Iodine | 28 grams |
| Polypropylene glycol (10–13 moles of ppo.) monoester of C-21 dicarboxylic acid (1 mole ppg. to 2 moles Diacid) | 135 grams |
| Iodine | 94.5 grams |
| Polypropylene glycol (10–13 moles ppo.) monoester of C-21 dicarboxylic acid (1 mole ppg. to 2 moles Diacid) | 100 grams |
| Iodine | 165 grams |
| Available iodine - 46.9% | |
| Polyethylene glycol (13.5 moles peo.) monoester of C-21 dicarboxylic acid (1 mole peg. to 1 mole Diacid) | 55 grams |
| Iodine | 45 grams |
| Polyethylene glycol (13.5 moles peo.) monoester of C-21 dicarboxylic acid (1 mole peg. to 1 mole Diacid) | 35 grams |
| Iodine | 65 grams |

*ppo = polypropylene oxide
ppg = polypropylene glycol
peg = polyethylene glycol
peo = polyethylene oxide Table 2

| Concentrates | | |
|---|---|---|
| 1. Polypropylene glycol (10–13 moles ppo.) monoester of C-21 dicarboxylic acid (1 mole ppg to 2 moles Diacid) | | 100 grams |
| Iodine | | 145 grams |
| Solubilizer-Octyl phenol polyethylene oxide (11 moles of ethylene oxide) condensate* | | 755 grams |
| | TOTAL | 1000 grams |
| (Available iodine  - 10.1% | | |
| pH  - 4.5%) | | |
| *Sold by Rohm and Haas as Triton X-102. | | |
| 2. Polyethylene glycol (9 moles peo.) monoester of C-21 dicarboxylic acid (1 mole peg. to 2 moles Diacid) | | 135 grams |
| Iodine | | 63 grams |
| Disodium phosphate | | 13 grams |
| Water | | 219 grams |
| Solubilizer Plurafac D-25** | | 570 grams |
| (C₁₂ to C₁₆ aliphatic alcohol approx. 6 parts of alcohol to 22 parts of mixed ethylene oxide-propylene oxide condensate) | | |

Table 2-continued

Concentrates

| | | |
|---|---|---|
| | TOTAL | 1000 grams |

(available iodine - 4.4%)
**Sold by Wyandotte Chemicals

| | | |
|---|---|---|
| 3. Polyethylene glycol (4.5 moles peo.) monoester of C-21 dicarboxylic acid (1 mole peg. to 2 moles diacid) | | 135 grams |
| Iodine | | 32 grams |
| Disodium phosphate | | 13 grams |
| Water | | 250 grams |
| Plurafac D-25 solubilizer | | 570 grams |
| | TOTAL | 1000 grams |

(available iodine - 2.0%)

| | | |
|---|---|---|
| 4. Polyethylene glycol (13.5 moles peg.) monoester of C-21 dicarboxylic acid (1 mole peg. to 1 mole of Diacid) | | 1.2 grams |
| Iodine | | 1.8 grams |
| Solubilizer - polyethylene-glycol (13.5 moles peg.) monoester of C-21 dicarboxylic acid (1 mole peg. to 1 mole of diacid) | | 15 grams |
| Water | | 82 grams |
| | TOTAL | 100 grams |

EXAMPLE 4

Sanitizer Formulations

The iodophor sanitizer compositions are generally marketed at 1 to 1.75% available iodine solutions. Typical sanitizer formulations are shown in Table 3.

Table 3

Sanitizer Formulations

| | | |
|---|---|---|
| 1. Polyethylene glycol (13.5 moles peo.) monoester of C-21 dicarboxylic acid (1 mole peg to 2 moles Diacid) | | 135 grams |
| Iodine | | 28 grams |
| Solubilizer - Octyl phenol polyethylene oxide (11 moles of ethylene oxide) condensate | | 100 grams |
| Water | | 737 grams |
| | TOTAL | 1000 grams |

Additions to disodium phosphate alkaline material were made to raise the pH within the range of about 4.5 to about 6.5. Figures are in grams.

| | | | |
|---|---|---|---|
| Sanitizer | 100 | 100 | 100 |
| Disodium phosphate | 0.4 | 0.8 | 1.2 |
| pH | 2.0 | 3.2 | 5.1 |

The available iodine of the above formulation was 1.56% when prepared and was 1.19 after five weeks storage.

| | | |
|---|---|---|
| 2. Polypropylene glycol (10–13 moles ppo) monoester of C-21 dicarboxylic acid (1 mole ppg to 2 moles Diacid) | | 135 grams |
| Iodine | | 28 grams |
| Octyl phenol polyethylene oxide (11 moles of ethylene oxide) condensate | | 170 grams |
| Alkaline material (disodium phosphate) | | 13 grams |
| Water | | 654 grams |
| | TOTAL | 1000 grams |

After formulating the above concentrate the pH was 6.5 and the available iodine was 1.73% by titration with sodium thiosulphate. Four months later the pH was 5.7 and the available iodine was 1.4%. A sample of the identical concentrate held at 100°F for 4 months analyzed 1.26% available iodine.

| | | |
|---|---|---|
| 3. Polyethylene glycol (13.5 moles peo.) monoester of C-21 dicarboxylic acid (1 mole peg to 2 moles Diacid) | | 135 grams |
| Iodine | | 14 grams |
| Octyl phenol polyethylene oxide (11 moles of ethylene oxide) condensate | | 50 grams |
| Water | | 847 grams |
| | TOTAL | 1046 grams |

Available iodine - 0.79%

| | |
|---|---|
| 4. Polyethylene glycol (13.5 moles peo.) monoester of C-21 dicarboxylic acid (1 mole peg. to 2 moles Diacid) | 135 grams |
| Iodine | 14 grams |
| Disodium phosphate | 8 grams |
| Monosodium phosphate | 3 grams |
| Propylene glycol | 20 grams |
| Octyl phenol polyethylene oxide (11 moles of ethylene oxide) condensate | 40 grams |

-continued

| | | |
|---|---|---|
| Water | | 840 grams |
| | TOTAL | 1060 grams |

Available iodine - 0.46%

| | | |
|---|---|---|
| 5. Polyethylene glycol (13.5 moles peo.) monoester of C-21 dicarboxylic acid (1 mole of peg to 1 mole Diacid) | | 10.5 grams |
| Iodine | | 19.5 grams |
| Solubilizer- monophosphate ester of 3 mole ethoxylated phenol (Sold by Witco Chemical under Emcol TS - 211 trademark) | | 300 grams |
| Water | | 670 grams |
| | TOTAL | 1000 grams |

Available iodine - 1.27%

| | | |
|---|---|---|
| 6. Polyethylene glycol (13.5 moles peo.) monoester of C-21 dicarboxylic acid (1 mole of peg. to 1 mole Diacid) | | 10.5 grams |
| Iodine | | 19.5 grams |
| Solubilizer- monophosphate ester of 9.5 mole ethyoxylated nonylphenol (Sold by Rohm & Haas under QS-30 trademark) | | 200 grams |
| Water | | 770 grams |
| | TOTAL | 1000 grams |

Available iodine - 1.27%

| | |
|---|---|
| 7. Polypropylene glycol (10-13 moles ppo.) monoester of C-21 dicarboxylic acid (1 mole ppg. to 2 moles Diacid) | 11.31 grams |
| Iodine | 18.69 grams |
| Water | 670 grams |

300 grams each of the following solubilizers were added to separate batches of the above to complete the formulations:
    (a) sodium sulphate of nonylphenol poly (ethyleneoxy) ethanol (Sold under Alipal EO 526 trademark by GAF Co.)
    Available iodine - 1.27%
    (b) mono and diphosphate ester of 6 mole ethoxylated $C_8$ to $C_{18}$ normal alcohols (Sold under GafacGB-520 trademark by GAF)
    Available iodine - 0.83%
    (c) monophosphoric ester of 4 to 6.8 EO-PO on $C_{10}$ to $C_{12}$ normal alcohols.
    Available iodine - 1.27%

| | | |
|---|---|---|
| 8. Polyethylene glycol (13.5 moles peg.) monoester of C-21 dicarboxylic acid (1 mole peg. to 1 mole of Diacid) | | 1.1 grams |
| Iodine | | 1.9 grams |
| Solubilizer - polyethylene glycol (13.5 moles peg.) monoester of C-21 dicarboxylic acid (1 mole peg. to 1 mole of Diacid) | | 8.0 grams |
| Solubilizer - monophosphate ester of 9.5 mole ethoxylated nonylphenol | | 2.0 grams |
| Water | | 87.0 grams |
| | TOTAL | 100 grams |

| | | |
|---|---|---|
| 9. Polyethylene glycol (13.5 moles peg.) monoester of C-21 dicarboxylic acid (1 mole peg. to 1 mole of diacid) | | 1.1 grams |
| Iodine | | 1.9 grams |
| Solubilizer - polyethylene glycol (13.5 moles peg.) monoester of C-21 dicarboxylic acid (1 mole peg. to 1 mole of Diacid) | | 8.0 grams |
| Solubilizer - monophosphate ester of 9.5 mole ethoxylated phenol | | 2.0 grams |
| Water | | 87.0 grams |
| | TOTAL | 100 grams |

EXAMPLE 5

Germicidal Effectiveness

The polypropylene glycol monoester of C-21 dicarboxylic acid concentrate 2 in Table 3, was evaluated for bacteriacidal effectiveness by the A.O.A.C. Available Chlorine Germicidal Equivalent Concentration Test, A.O.A.C. Methods of Analysis, 11th Ed. 1970, pages 63–64, and was found to be equal to sodium hypochlorite. The available iodine of the Iodophor at 50, 25 and 12.5 parts per million was tested against a standard sodium hypochlorite solution of 200, 100, and 50 parts per million of chlorine. Tests were made on two organisms: Salmanela typhosa, ATCC 6539 and Staphylococcus aureous, ATCC 6538. The results of this test shown in Table 4 indicate that the iodine sanitizer is bacteriacidally equivalent to the hypochlorite standard.

Table IV - Bactericidal Effectiveness

1. Salmanela Typhosa - ATCC - 6539
Available Chlorine Germicidal Equivalent Concentration Test

| Germicide | Concn. PPM | Subculture Series | | | | | | | | | |
|---|---|---|---|---|---|---|---|---|---|---|---|
| | | 1 | 2 | 3 | 4 | 5 | 6 | 7 | 8 | 9 | 10 |
| NaOCl Control | 200 | − | − | − | − | − | − | + | + | + | + |
| | 100 | − | − | − | + | + | + | + | + | + | + |
| | 50 | − | − | + | + | + | + | + | + | + | + |
| Concentrate 2 Table 3 | 50 | − | − | − | − | − | − | − | − | − | − |
| | 25 | − | − | − | − | − | − | − | − | − | + |
| | 12.5 | − | − | − | − | − | − | + | + | + | + |

| | Phenol Coefficient | | |
|---|---|---|---|
| | 5 mins | 10 mins | 15 mins |
| 1–80 | + | + | − |
| 1–90 | + | + | − |
| 1–100 | + | + | + |

2. Staphylococcus Aureous - ATCC - 6538
Available Chlorine Germicidal Equivalent Concentration Test

| Germicide | Concn. PPM | Subculture Series | | | | | | | | | |
|---|---|---|---|---|---|---|---|---|---|---|---|
| | | 1 | 2 | 3 | 4 | 5 | 6 | 7 | 8 | 9 | 10 |
| NaOCl Control | 200 | − | − | − | − | − | + | + | + | + | + |
| | 100 | − | − | − | + | + | + | + | + | + | + |
| | 50 | − | + | + | + | + | + | + | + | + | + |
| Concentrate 2 Table 3 | 50 | − | − | − | − | − | − | − | + | + | + |
| | 25 | − | − | − | − | − | + | + | + | + | + |
| | 12.5 | − | − | + | + | + | + | + | + | + | + |

| | Phenol Coefficient | | |
|---|---|---|---|
| | 5 min | 10 min | 15 min |
| 1–60 | − | − | − |
| 1–70 | + | + | − |
| 1–80 | + | + | + |

I claim:

1. The anionic iodophor composition consisting essentially of a polyalkylene oxide glycol monoester of C-21 dicarboxylic acid represented by the structural formula

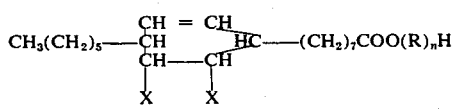

or

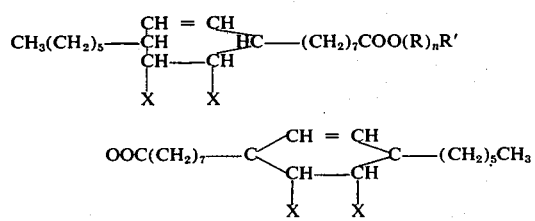

where R is ethylene oxide, propylene oxide or mixed ethylene-propylene oxides in random distribution or block groups, X is hydrogen and the other X is carboxylic, $n$ is about 3 to about 34, R' is ethylene or propylene, and having a mole ratio of polyalkylene oxide glycol to C-21 dicarboxylic acid within the range of about 1 to 1 to about 1 to 2, said monoester containing from about 1 to about 47% by weight available iodine.

2. The anionic iodophor composition of claim 1 in which the polyalkylene oxide glycol is polypropylene oxide glycol containing from 10 to 13 moles of propylene oxide and the mole ratio of glycol to C-21 dicarboxylic acid is about 1 to about 2.

3. The anionic iodophor composition of claim 1 in which the polyalkylene oxide glycol is polyethylene oxide glycol containing about 9 moles of ethylene oxide and the mole ratio of glycol to C-21 dicarboxylic acid is about 1 to about 2.

4. The anionic iodophor composition of claim 1 in which the polyalkylene oxide glycol is polyethylene oxide glycol containing about 4.5 moles of ethylene oxide and the mole ratio of glycol to C-21 dicarboxylic acid is about 1 to about 2.

5. The anionic iodophor composition of claim 1 in which the polyalkylene oxide glycol is polyethylene oxide glycol containing about 13.5 moles of ethylene oxide and the mole ratio of glycol to C-21 dicarboxylic acid is about 1 to 1.

6. The anionic iodophor concentrate comprising the iodophor composition of claim 1 and an amount sufficient to put the said iodophor composition in aqueous solution of at least one iodine solubilizer selected from the group consisting of anionic alkoxylated phosphate esters, anionic alkoxylated sulfate esters and anionic polyalkylene oxide glycol monoesters of C-21 dicacarboxylic acid represented by the structural formula

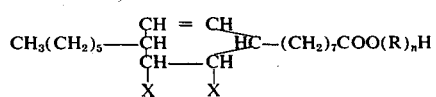

or

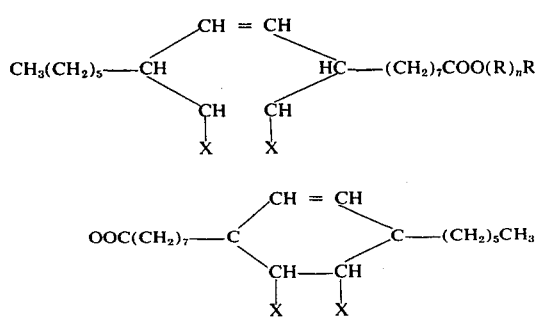

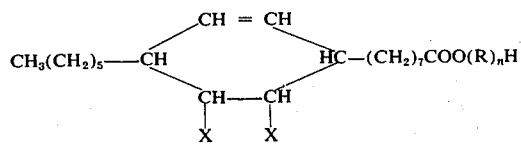

where R is ethylene oxide, propylene oxide or mixed ethylene-propylene oxides in random distribution or block groups, X is hydrogen and the other X is carboxylic, n is about 3 to about 34, R' is ethylene or propylene, and having a mole ratio of polyalkylene oxide glycol to C-21 dicarboxylic acid within the range of about 1 to 1 to about 1 to 2.

7. The anionic iodophor concentrate comprising the iodophor composition of claim 5 and an amount sufficient to put the said iodophor composition in aqueous solution of at least one iodine solubilizer selected from the group consisting of anionic alkoxylated phosphate esters, anionic alkoxylated sulfate esters and anionic polyalkylene oxide glycol monoesters of C-21 dicarboxylic acid represented by the structural formula

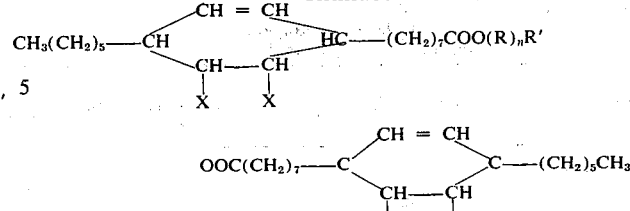

or where R is ethylene oxide, propylene oxide or mixed ethylene-propylene oxides in random distribution or block groups, X is hydrogen and the other X is carboxylic, n is about 3 to about 34, R' is ethylene or propylene, and having a mole ratio of polyalkylene oxide glycol to C-21 dicarboxlyic acid within the range of about 1 to 1 to about 1 to 2.

8. The iodophor concentrate comprising the iodophor composition of claim 1 and a sufficient amount of an anionic or nonionic iodine solubilizer to put the said iodophor composition in aqueous solution.

9. The iodine sanitizer composition comprising the iodophor concentrate of claim 6 and sufficient water to bring the available iodine concentration of the sanitizer composition within the range of about 1 to 1.75% by weight, said composition having a pH within the range of about 4 to about 6.5.

10. The iodine sanitizer composition comprising the iodophor concentrate of claim 7 and sufficient water to bring the available iodine concentration within the range of about 1 to about 1.75% by weight, said composition having a pH within the range of about 4 to about 6.5.

11. The iodine sanitizer composition comprising the iodophor concentrate of claim 8 and sufficient water to bring the available iodine concentration within the range of about 1 to about 1.75% by weight, said composition having a pH within the range of about 4 to about 6.5.

* * * * *

UNITED STATES PATENT OFFICE
CERTIFICATE OF CORRECTION

Patent No. 3,917,822    Dated November 4, 1975

Inventor(s) George Holbrook Turney

It is certified that error appears in the above-identified patent and that said Letters Patent are hereby corrected as shown below:

Column 4, line 66, "sulflate" should be --sulfate--

Column 6, line 36, "test" should be --teat--

Table 2, line 9, "pH - 4.5%" should be --pH -4.5 --

Column 11, line 65, "bacteriacidal" should be --bactericidal--

Column 12, line 64, "Salmanela" should be --Salmonella--

Column 12, line 65, "aureous" should be --aureus--

Column 12, line 67, "bacteriacidally" should be --bactericidally--

Table IV, line 2, "Salmanela Typhosa" should be --Salmonella typhosa--

Table IV, line 20, "Aureous" should be --aureus--

Signed and Sealed this

Tenth Day of August 1976

[SEAL]

Attest:

RUTH C. MASON
Attesting Officer

C. MARSHALL DANN
Commissioner of Patents and Trademarks